Patented Nov. 18, 1941

2,263,322

UNITED STATES PATENT OFFICE 2,263,322

STABILIZED AQUEOUS DISPERSIONS OF CHLOROPRENE POLYMERS AND PROCESS OF PRODUCING SAME

Herbert W. Walker and Frank N. Wilder, Woodstown, N. J., assignors to E. I. du Pont de Nemours & Company, Wilmington, Del., a corporation of Delaware No Drawing. Application June 29, 1938, Serial No. 216,587

21 Claims. (Cl. 260—32)

This invention relates to the stabilization of aqueous dispersions of polymerized halogen containing dienes. More particularly it relates to the stabilization of dispersions of polymers of chloro-2-butadiene-1,3 (hereinafter called chloroprene). Still more particularly it relates to the stabilization of such dispersions against the coagulating effects of electrolytes and finely divided solids.

In the utilization of the latex-like dispersions made by polymerizing chloroprene dispersed in aqueous media, it is often advantageous to add certain electrolytes or finely divided insoluble materials such as pigments and reenforcing agents. These added materials, however, often cause flocculation or coagulation or at least tend to make the dispersions more sensitive to coagulation by agitation or storage.

It has been disclosed in a copending application of Dales and Downing, Serial No. 128,630, filed March 2, 1937, which has now matured into U. S. Patent 2,138,226, patented November 29, 1938, that aqueous dispersions of chloroprene may be prepared using among other things certain compounds called betaines (more fully described hereinafter) as emulsifying agents. This application discloses that chloroprene so dispersed may thereafter be polymerized while in the dispersed state. While disclosing the operability of the betaines, however, this copending application also points out that dispersions prepared with betaines show somewhat more tendency to separate than do dispersions prepared with certain other materials as emulsifying agents.

It is an object of the present invention to stabilize aqueous dispersions of polymerized halogen containing dienes. Another object of the invention is to stabilize aqueous dispersions of polymerized chloroprene. A still further object of the present invention is to stabilize such dispersions and particularly those containing polymerized chloroprene against coaguiating, flocculating, and sensitizating effects such as those of electrolytes and finely divided solids. Other objects will appear hereinafter.

It has now been found that these objects may be accomplished by relying upon some other emulsifying agent than a betaine to prepare the dispersion of the monomeric chloroprene or related halogen containing diene and adding, in addition, a small amount of a water soluble betaine containing a long hydrocarbon chain. The preferred embodiment of the invention is the stabilization of dispersions of polymerized chloroprene.

In order to illustrate the invention, the following example is given showing in detail one preferred embodiment. It should be understood, however, that this example is intended to be illustrative only and is not intended to limit the scope of the invention. The term "parts" whenever hereinafter used signifies "parts by weight."

Example

One hundred parts of chloroprene substantially free from monovinyl acetylene, acetaldehyde, divinyl acetylene, methyl vinyl ketone, and dichloro-1,3-butene-2, and in which 0.5 part of sulfur and 2 parts of cyclohexanol have been dissolved is emulsified by gradual addition, with the rapid mechanical agitation secured by repeated passage thru a centrifugal pump, to 100 parts of a solution, in water, of 2% of the sodium salt of the sulfuric acid esters of a mixture of straight chain aliphatic alcohols with an average chain length of about 13 carbon atoms obtained from coconut oil. The dispersion is then maintained in a vessel which can be externally heated or cooled at a temperature of 25° C. until the polymerization is substantially complete, as is shown by the rise in density of the dispersion (measured at 20° C.) to about 1.10. This usually requires about 20 hours. There is then added to the latex 0.73 part of a 29% aqueous ammonia solution and also a liquid mixture of 0.55 part of phenyl alpha naphthylamine and 0.45 part of diphenylamine dispersed in 1 part of a 3% aqueous solution of the sodium salt of an acid obtained by condensing naphthalene sulfonic acids with formaldehyde, according to U. S. Patent No. 1,191,480. Thereafter 2% of C-cetyl betaine,

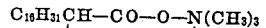

$$C_{16}H_{31}CH-CO-O-N(CH_3)_3$$

based on the amount of the chloroprene polymer present, is added with stirring in the form of a 10% aqueous solution of the betaine.

To demonstrate the stability of this treated latex, 10% of potassium fluoride, based on the amount of chloroprene polymer present, is added in the form of a 10% aqueous solution. No coagulation takes place on mixing the solution with the latex and the mixture remains indefinitely without flocculation or coagulation. On the other hand, the addition of the fluoride to the same latex to which no betaine had been added caused instant and complete coagulation. As a further demonstration of stability, 10% of zinc oxide, based on the amount of chloroprene polymer present, is added in the form of a 50% dispersion in a 3% aqueous solution of ammonium caseinate containing 1% of the sodium salt of the sulfonic acids prepared according to U. S. Patent No. 1,191,480 by condensing naphthalene sulfonic acids with formaldehyde. No coagulation or flocculation takes place even on long standing, whereas a latex not stabilized by the addition of betaine is almost completely coagulated when treated in this way with the zinc oxide dispersion. The treated latex is likewise stable toward the addition of 10% solutions of other electrolytes such as sodium hydroxide, trisodium phosphate, sodium carbonate, ammonium persulfate, and ammonium hydroxide and other finely divided solids such as sulfur, carbon black, lithopone, whiting, "Titanox," aluminum hydroxide, zinc hydroxide, phenyl beta naphthylamine, and tetramethyl thiuram disulfide.

The present invention may be applied to advantage to any dispersions of polymerized chloroprene and related halogen containing dienes made with dispersing agents other than betaines such as those dispersions described in U. S. Patents Nos. 1,967,861; 2,066,329; 2,066,330; and 2,066,331; and in the copending applications of Starkweather, Serial No. 69,739, filed March 19, 1936; Starkweather and Collins, Serial No. 69,737, filed March 19, 1936; Starkweather and Collins, Serial No. 156,518, filed July 20, 1937; Starkweather and Wilder, Serial No. 216,586, filed June 29, 1938; and Collins, Serial No. 204,305, filed April 26, 1938. It is particularly applicable to dispersions which are to be used for coating and impregnating cloth and other porous materials and for the direct formation of thin-walled articles. Preferred embodiments of the invention involve the use of the latices in which the dispersing agents are (1) water-soluble salts of carboxylic acids containing long hydrocarbon chains or polycyclic systems (oleates, abietates); (2) water-soluble salts of sulfuric acid esters obtainable by sulfation of hydroxy compounds containing long hydrocarbon chains, such as the latices, the preparation of which is described in the above example, in Example 1 of the application of Starkweather and Wilder, above referred to, and in Example 4 of U. S. Patent No. 1,967,861.

The betaine used may be any water-soluble compound which contains the following nucleus:

in which $R_1$ is a divalent aliphatic radical and $R_2$, $R_3$, and $R_4$ are monovalent aliphatic radicals, one of which radicals $R_1$, $R_2$, $R_3$ and $R_4$ contains more than 12 carbon atoms, in which N is separated from X by less than 5 carbon atoms and in which —X—O— is an acidic salt forming group, the free valences of the nitrogen and of the oxygen in the nucleus having been satisfied in the compounds by each other or by a pair of oppositely charged ions. The betaines are believed to exist in aqueous solution in one or both of the forms represented by the following general formulae which also indicate to which portions of the molecule the various ions are attached:

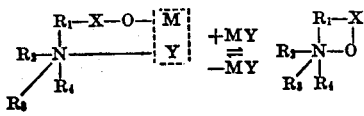

in which M is hydrogen or a base metal, preferably an alkali metal, such as sodium or potassium, Y is hydroxyl, halogen, or other anion, preferably chlorine or bromine, $R_1$ is a divalent aliphatic radical and $R_2$, $R_3$ and $R_4$ are monovalent aliphatic radicals, one of which radicals $R_1$, $R_2$, $R_3$ and $R_4$ contains more than 12 carbon atoms and in which N is separated from X by less than 5 carbon atoms, preferably 1 and the group —X—O— is an acidic salt forming group which is free of acid hydrogens, such as —CO—O—, —SO$_2$—O—, —O—SO$_2$—O—, and the like. Thus, the term "betaine" as used herein includes not only the compounds in which the —X—O— group is joined directly to the nitrogen thru one of its oxygen atoms but also includes the substances formed by the hydrolysis of such compounds with the formation of both acidic and basic groups in the same molecule as well as the products formed by neutralization of one or both of these groups by, for example, acids or bases. Where the terms "C-substituted" or "N-substituted" are used herein the substituent referred to is the long hydrocarbon chain. Thus, in the above formulae where the long chain is a part of the divalent radical, $R_1$, the compound is said to be "C-substituted" and where $R_2$, $R_3$, or $R_4$ is the long chain, the compound is said to be "N-substituted." The aliphatic groups may be either saturated or unsaturated and may contain substituent groups such as hydroxyl and halogen. As further specific illustrations of the various compounds coming under this general description, the following may be mentioned, N-stearyl betaine,

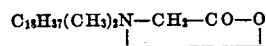

N-ocenyl betaine (ocenyl represents a mixture of unsaturated and saturated straight chain radicals containing approximately 17 carbon atoms).

$C_{16}H_{33}(CH_3)_2N(Br)$—$CH_2$—$CHOH$—$SO_2$—O—Na

C-cetyl di(hydroxyethyl) betaine,

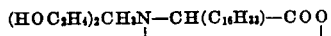

These all act in the same way as the C-cetyl betaine in the example above. The C-substituted betaines and particularly C-cetyl betaine are preferred. The preparation and properties of the betaines are described in a copending application of Downing and Johnson, Serial No. 13,664, filed March 29, 1935.

The preferred proportion of betaine used lies between 1 and 5%, based on the weight of polymer. Lower proportions, such as from 0.25% to 0.5%, may be used in some cases, but are in general not enough to give complete protection against 10% of potassium fluoride, for example. Such lower proportions will, however, stabilize the latex against storage and low concentrations of electrolytes. As the proportion is increased much beyond the above upper limit, further increases have little additional effect upon the stability and finally may even cause coagulation. Accordingly, the betaine is preferably added as a solution not more concentrated than 10%, in order to avoid local coagulation.

The betaine is added in the above example immediately before the addition of the electrolyte or pigment. Other procedures are also advantageous and, in general, the addition of the betaine to any of the latices mentioned above during the course of their preparation as well as afterward is within the scope of the invention. For instance, it may be added simultaneously with the electrolyte or pigment. It is also often desirable to add the betaine before or during the polymerization of the chloroprene (as disclosed in a copending application of Collins, Serial No. 204,305, filed April 26, 1938. In this application, it is taught that chloroprene may be polymerized in emulsion in the presence of sulfur. Any of the forms of sulfur which are soluble in chloroprene may be used. Ordinarily, the sulfur is dissolved directly in chloroprene before emulsification. It is sometimes more convenient, however, to dissolve it in a solvent such as carbon disulfide which is then mixed with the chloroprene. The proportion of sulfur used is ordinarily from about 0.25 per cent based on the chloroprene, up to the maximum amount soluble in the chloroprene at the temperature of polymerization.) Thus, for example, when C-cetyl betaine is added to the emulsifying solution before polymerization of the chloroprene in the above example or in Example I of the copending application of Starkweather and Wilder, Serial No. 216,586, filed June 29, 1938, the emulsification and polymerization proceed in much the same way and a latex stable to potassium fluoride results. The addition of betaines to solutions of certain emulsifying agents, however, causes them to gel and hence lose much of their emulsifying property. The addition of the betaine to the finished latex is therefore a much more generally applicable procedure, since the betaine may be added to polymer dispersions made with these emulsifying agents without gelling or thickening. The betaine may be incorporated in any desired manner although it is ordinarily most satisfactory to add it to the dispersion medium or to the dispersion, as the case may be, in the form of a dilute solution as disclosed above. If desired, part may be added at one time and part at another and two or more different betaines may be used together.

As shown in the above example in which the latex treated is that formed by the procedure given in Example 2 of the copending Starkweather and Wilder application, the latices of the latter application which have already been stabilized against coagulation by mechanical agitation and storage by the addition of certain alcohols and ketones, are further stabilized by the addition of betaines against coagulation by electrolytes and pigments. The two types of stabilizers thus exert their principal effects against two different sets of coagulating conditions and hence their joint use is particularly advantageous. Accordingly, the present applicants contemplate, as part of their invention disclosed herein, the use of the betaines disclosed herein both broadly and specifically with each and every modification of the process set forth in the Starkweather and Wilder application filed on even date herewith for the production of synthetic latex and which is described in that application. Therefore, the entire specification of the aforesaid Starkweather and Wilder application is incorporated in this application by reference, and it is intended that the Starkweather and Wilder application so far as it is concerned with the production and use of synthetic latex shall be considered a part of the specification of this case. The following specific parts of the disclosure of the aforesaid Starkweather and Wilder application are included here as of particular importance.

It has been found that the tensile strength of the compounded and cured material is greatly increased if small proportions of zinc oxide together with organic compounds containing one nitrogen atom and two sulfur atoms attached to the same carbon atom are added along with the other compounding ingredients. Examples of such compounds are thiazyl mercaptans and sulfides, thiuram sulfides, and dithiocarbamates.

The stability of the latex is improved by the addition of water-soluble alcohols and ketones. The preferred material is cyclohexanol, but the present invention is not limited to the use of this particular reagent. Thus, n-butanol, n-octanol, methyl cyclohexanol, and cyclohexanone, for example, have been found to give very similar results when used in place of cyclohexanol in the above procedure. The preferred alcohols and ketones are those which have a limited solubility in water, from about 1 per cent to about 20 per cent at ordinary temperature. Further examples are n-hexanol, benzyl alcohol, methyl butyl ketone, and diethyl ketone. Less soluble compounds, for example borneol, terpineol, and the mixture of alcohols present in pine oil, have a considerable effect, as do the more soluble compounds such as ethyl alcohol and acetone, but, in general, they are less effective than the preferred agents in stabilizing the latex and have much less effect in controlling polymerization, viscosity and color. Furthermore, an alcohol and a ketone or a plurality of alcohols or of ketones or of both may be employed.

The operable as well as the preferred concentrations of the alcohols and ketones which may be used varies with the different compounds. It is not, therefore, practicable to set forth limiting or preferred concentrations for the whole class. In the case of cyclohexanol, from 1 to 3 per cent based on the polymer is the preferred range and within this range, as indicated by the above examples, 2 per cent is particularly preferred. Both somewhat lower and somewhat higher proportions than those given as the preferred range may be used, but lower proportions are considerably less effective while larger amounts tend to reverse the phases of the chloroprene emulsion. For the other alcohols and ketones, it is possible, by a simple experiment, to determine readily the proper amounts to employ. It will be found in each case, however, that there is a preferred range and an operable range and that at either end of the operable range the same effects result as in the case of cyclohexanol. The best general characterization of the amounts of the alcohols and ketones as a class is that they are small amounts as compared with the quantity of chloroprene or polymerized chloroprene employed.

In addition to the effect upon the stability of the latex exerted by the alcohols and ketones, the purity of the chloroprene and the concentrations of the emulsifying agents and of the hydrogen ions also have some influence. For example, for the preparation of the stable latices, the chloroprene should not contain more than 0.5 per cent of dichloro-1,3-butene-2 or other impurities which yield acids on hydrolysis. Impurities, in general, usually affect the properties of the polymer adversely, and, therefore, the chloroprene should be substantially free from divinyl acetylene and should not contain more than 0.5 per cent of monovinyl acetylene or 0.2 per cent of acetaldehyde.

The present invention is also particularly valuable when used in connection with that embodiment of the invention described in a copending application of Walker, Serial No. 205,011, filed April 29, 1938, in which soluble fluorides are added to neoprene latex in order to prevent the deterioration of cellulose fabrics which are to be treated with the latex. The present invention allows the incorporation of adequate quantities of soluble fluorides without coagulation.

The uses of the stabilized synthetic latex produced according to the process of the present invention include all the uses which have been set forth in any of the above identified applications for any of the latices disclosed in those applications. In addition, however, the latices of the present invention are in many cases better adapted to those uses particularly where various electrolytes or finely divided insoluble material, such as pigments and reinforcing agents are also added. In fact, the stabilized latices produced by the process of the present invention have an even wider field of use than the previously disclosed latices since, as disclosed above, they are stable to the incorporation of many electrolytes and compounding ingredients to the incorporation of which previously disclosed latices are not stable or at least are not sufficiently stable to have commercial utility, particularly where such materials are incorporated in large amounts.

As has been disclosed above, the betaines are always used according to the present invention along with another emulsifying agent. Only under such circumstances is it possible to avoid partial coagulation during polymerization and produce with them the highly stable dispersions described herein since, as disclosed in the above identified Dales and Downing application, dispersions of chloroprene and related halogen dienes prepared with betaines alone, particularly during polymerization, sometimes partially coagulate. In fact, it is surprising that the betaines even with another emulsifying agent would give such stability to the dispersions in which they are present. That dispersions prepared with betaines and certain other similar dispersing agents are difficult to coagulate completely is known from a copending application of Calcott and Youker, Serial No. 181,602, filed December 24, 1937 but since nevertheless it was also known prior to the present invention that dispersions prepared with betaines alone were not hard to coagulate in part, it was not expected that the betaines could be employed in any way to produce the extremely stable dispersions described herein. The important question with regard to stability of a latex is not whether it is easy or difficult to coagulate completely but instead is whether it coagulates at all. As a matter of fact, the results obtained by the present invention were even more unexpected than has been indicated since although emulsions or dispersions prepared with the simple quaternary ammonium salts as emulsifying agents are similar to those prepared with betaines in that they are difficult to coagulate completely, it was also known prior to the present invention that the simple quaternary ammonium salts could not be used as are the betaines herein to produce highly stable dispersions.

It is apparent that many widely different embodiments of this invention may be made without departing from the spirit and scope thereof and, therefore, it is not intended to be limited except as indicated in the appended claims.

We claim:

1. A stable aqueous dispersion of a polymer of chloro-2-butadiene-1,3 comprising an emulsifying agent having both emulsifying characteristics and stabilizing characteristics, which emulsifying agent is a water-soluble betaine which contains the following nucleus

in which $R_1$ is a divalent aliphatic radical and $R_2$, $R_3$, and $R_4$ are monovalent aliphatic radicals, one of which radicals $R_1$, $R_2$, $R_3$, and $R_4$ contains more than 12 carbon atoms, in which N is separated from X by less than 5 carbon atoms and in which —X—O— is an acidic salt forming group, the free valences of the nitrogen and of the oxygen in the nucleus having been satisfied in the compounds by each other or by a pair of oppositely charged ions, and a different emulsifying agent.

2. A product as described in claim 1, further characterized in that the betaine is present in an amount equal to from about 1% to about 5% by weight, based on the polymer.

3. A stable aqueous dispersion of a polymer of chloro-2-butadiene-1,3 comprising from about 1% to about 5%, by weight, based on the polymer, of a water-soluble compound which contains the following nucleus

in which $R_1$ is a divalent aliphatic radical and $R_2$, $R_3$, and $R_4$ are monovalent aliphatic radicals, one of which radicals $R_1$, $R_2$, $R_3$, and $R_4$ contains more than 12 carbon atoms, in which N is separated from X by less than 5 carbon atoms and in which —X—O— is an acidic salt forming group, the free valences of the nitrogen and of the oxygen in the nucleus having been satisfied in the compounds by each other or by a pair of oppositely charged ions, said aqueous dispersion being one prepared by polymerizing chloro-2-butadiene-1,3, which is substantially free from impurities which yield acids on hydrolysis, while the said chloro-2-butadiene-1,3 is dispersed in an aqueous medium in the presence of a quantity of sulfur ranging from about 0.25% of the weight of the chloro-2-butadiene-1,3 up to about the amount soluble in the chloro-2-butadiene-1,3 under the conditions of the polymerization, and of an emulsifying agent of the group consisting of water-soluble salts of carboxylic acids containing long hydrocarbon chains, water-soluble salts of carboxylic acids containing polycyclic systems, and water-soluble salts of sulfuric acid esters obtained by sulfation of hydroxy compounds containing long hydrocarbon chains.

4. In the process of preparing a stable aqueous dispersion of a chloro-2-butadiene-1,3 polymer, the step which comprises incorporating an emulsifying agent having both emulsifying characteristics and stabilizing characteristics, which emulsifying agent is a water-soluble betaine which contains the following nucleus

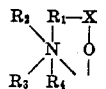

in which $R_1$ is a divalent aliphatic radical and $R_2$, $R_3$, and $R_4$ are monovalent aliphatic radicals, one of which radicals $R_1$, $R_2$, $R_3$, and $R_4$ contains more than 12 carbon atoms, in which N is separated from X by less than 5 carbon atoms and in which —X—O— is an acidic salt forming group, the free valences of the nitrogen and of the oxygen in the nucleus having been satisfied in the compounds by each other or by a pair of oppositely charged ions, and a different emulsifying agent.

5. A process as described in claim 4, further characterized in that the betaine is added in an amount equal to from about 1% to about 5%, by weight, based on the polymer.

6. A stable aqueous dispersion of a polymer of chloro-2-butadiene-1,3 comprising an emulsifying agent of the group consisting of water-soluble salts of carboxylic acids containing long hydrocarbon chains, water-soluble salts of carboxylic acids containing polycyclic systems, and water-soluble salts of sulfuric acid esters obtained by sulfation of hydroxy compounds containing long hydrocarbon chains and from about 1% to about 5%, by weight, based on the polymer, of a water-soluble compound which contains the following nucleus

in which $R_1$ is a divalent aliphatic radical and $R_2$, $R_3$, and $R_4$ are monovalent aliphatic radicals, one of which radicals $R_1$, $R_2$, $R_3$, and $R_4$ contains more than 12 carbon atoms, in which N is separated from X by less than 5 carbon atoms and in which —X—O— is an acidic salt forming group, the free valences of the nitrogen and of the oxygen in the nucleus having been satisfied in the compounds by each other or by a pair of oppositely charged ions.

7. A dispersion as described in claim 6, further characterized in that the betaine is a C-substituted betaine.

8. A dispersion as described in claim 3, further characterized in that the betaine is a C-substituted betaine.

9. A stable aqueous dispersion of a polymer of chloro-2-butadiene-1,3 comprising from about 0.25% to about 1%, by weight, based on the polymer, of a water-soluble compound which contains the following nucleus

in which $R_1$ is a divalent aliphatic radical and $R_2$, $R_3$, and $R_4$ are monovalent aliphatic radicals, one of which radicals $R_1$, $R_2$, $R_3$, and $R_4$ contains more than 12 carbon atoms, in which N is separated from X by less than 5 carbon atoms and in which —X—O— is an acidic salt forming group, the free valences of the nitrogen and of the oxygen in the nucleus having been satisfied in the compounds by each other or by a pair of oppositely charged ions, said aqueous dispersion being one prepared by polymerizing chloro-2-butadiene-1,3, which is substantially free from impurities which yield acids on hydrolysis, while the said chloro-2-butadiene-1,3 is dispersed in an aqueous medium in the presence of a quantity of sulfur ranging from about 0.25% of the weight of the chloro-2-butadiene-1,3 up to about the amount soluble in the chloro-2-butadiene-1,3 under the conditions of the polymerization, and of an emulsifying agent of the group consisting of water-soluble salts of carboxylic acids containing long hydrocarbon chains, water-soluble salts of carboxylic acids containing polycyclic systems, and water-soluble salts of sulfuric acid esters obtained by sulfation of hydroxy compounds containing long hydrocarbon chains.

10. A dispersion as described in claim 9, further characterized in that the betaine is a C-substituted betaine.

11. A stable aqueous dispersion of a polymer of chloro-2-butadiene-1,3 comprising about 2%, by weight, based on the polymer, of C-cetyl betaine, said aqueous dispersion being one prepared by polymerizing chloro-2-butadiene-1,3 which is substantially free from monovinylacetylene, acetaldehyde, divinylacetylene, and impurities which yield acids on hydrolysis while the said chloro-2-butadiene-1,3 is dispersed in an aqueous medium in the presence of the sodium salts of the sulfuric acid esters of a mixture of straight chain aliphatic alcohols with an average chain length of about 13 carbon atoms obtained from coconut oil as emulsifying agents, and in the presence of about 0.5% of sulfur and about 2% of cyclohexanol, both by weight based on the chloro-2-butadiene-1,3, then when polymerization is substantially complete adding a small amount of a dilute aqueous ammonium hydroxide solution and a liquid mixture of about 0.55% of phenyl alpha naphthylamine and about 0.45% of diphenylamine dispersed in about 1% of an about 3% aqueous solution of the sodium salt of an acid obtained by condensing naphthalene sulfonic acids with formaldehyde, the first three percentages being by weight based on the polymer and the latter by weight based on the water, and thereafter adding the C-cetyl betaine with stirring in the form of a dilute aqueous solution.

12. A stable aqueous dispersion of a polymer of chloro-2-butadiene-1,3 comprising about 2%, by weight, based on the polymer, of C-cetyl betaine, said aqueous dispersion being one prepared by polymerizing chloro-2-butadiene-1,3 which is substantially free from monovinylacetylene, acetaldehyde, divinylacetylene, and impurities which yield acids on hydrolysis while the said chloro-2-butadiene-1,3 is dispersed in an aqueous medium in the presence of sodium abietate as an emulsifying agent and in the presence of about 0.25% of sodium hydroxide and about 0.25% of ammonium persulfate, both percentages being by weight based on the aqueous medium, and also in the presence of about 0.25% of sulfur and about 2% of cyclohexanol, both by weight based on the chloro-2-butadiene-1,3, then when polymerization is substantially complete adding a small amount of a dilute aqueous ammonium hydroxide solution and a liquid mixture of about 0.55% of phenyl alpha naphthylamine and about 0.45% of diphenylamine dispersed in about 1% of an about 3% aqueous solution of the sodium salt of an acid obtained by condensing naphthalene sulfonic acids with formaldehyde, the first three percentages being by weight based on the polymer and the latter by weight based on the water, and thereafter adding the C-cetyl betaine with stirring in the form of a dilute aqueous solution.

13. A stable aqueous dispersion of a polymer of chloro-2-butadiene-1,3 comprising about 2% by weight based on the polymer of C-cetyl betaine, said aqueous dispersion being one prepared by polymerizing chloro-2-butadiene-1,3 while it is dispersed in an aqueous medium containing sodium oleate as an emulsifying agent, then when polymerization is complete, adding a small amount of concentrated ammonium hydroxide solution, and thereafter adding the betaine with stirring in the form of a dilute aqueous solution.

14. The process which comprises dispersing chloro-2-butadiene-1,3 in an aqueous medium in the presence of an emulsifying agent of the group consisting of water-soluble salts of carboxylic acids containing long hydrocarbon chains, water-soluble salts of carboxylic acids containing polycyclic systems, and water-soluble salts of sulfuric acid esters obtained by sulfation of hydroxy compounds containing long hydrocarbon chains, then polymerizing the chloro-2-butadiene-1,3 while it is dispersed in the aqueous medium, and thereafter adding from about 1% to about 5% by weight based upon the polymer of a water-soluble compound which contains the following nucleus

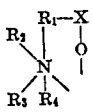

in which $R_1$ is a divalent aliphatic radical and $R_2$, $R_3$, and $R_4$ are monovalent aliphatic radicals, one of which radicals $R_1$, $R_2$, $R_3$, and $R_4$ contains more than 12 carbon atoms, in which N is separated from X by less than 5 carbon atoms and in which —X—O— is an acidic salt forming group, the free valences of the nitrogen and of the oxygen in the nucleus having been satisfied in the compounds by each other or by a pair of oppositely charged ions.

15. The process of compounding a polymer of chloro-2-butadiene-1,3 which comprises adding compounding ingredients, a small amount of zinc oxide, and a somewhat smaller amount of an organic compound of the group consisting of thiazyl mercaptans and sulfides, thiuram sulfides, and dithiocarbamates, to a dispersion as described in claim 3.

16. The process which comprises dispersing in an aqueous medium containing as an emulsifying agent a water-soluble compound of the group consisting of water-soluble salts of carboxylic acids containing long hydrocarbon chains, water-soluble salts of carboxylic acids containing polycyclic systems, and water-soluble salts of sulfuric acid esters obtained by sulfation of hydroxy compounds containing long hydrocarbon chains, chloro-2-butadiene-1,3 which is substantially free from impurities which yield acids on hydrolysis and to which has been added a quantity of sulfur ranging from about 0.25% of the weight of the chloro-2-butadiene-1,3 up to about the amount soluble in the chloro-2-butadiene-1,3 under the conditions of the polymerization and to which has also been added a small amount insufficient to cause reversal in phase of the emulsion of a mixture of a non-polymerizable alcohol and a non-polymerizable ketone each having a solubility in water limited to from about 1% to about 20% at ordinary temperature, and then polymerizing the chloro-2-butadiene-1,3 while so dispersed in the presence of the water-soluble non-polymerizable alcohol and the water-soluble non-polymerizable ketone and of the sulfur, and thereafter when polymerization is complete adding to the resulting dispersion from about 1% to about 5%, by weight, based on the polymer, of a water-soluble compound which contains the following nucleus

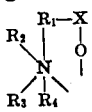

in which $R_1$ is a divalent aliphatic radical and $R_2$, $R_3$, and $R_4$ are monovalent aliphatic radicals, one of which radicals $R_1$, $R_2$, $R_3$, and $R_4$ contains more than 12 carbon atoms, in which N is separated from X by less than 5 carbon atoms and in which —X—O— is an acidic salt-forming group, the free valences of the nitrogen and of the nitrogen and of the oxygen in the nucleus having been satisfied in the compounds by each other or by a pair of oppositely charged ions.

17. The process which comprises dispersing in an aqueous medium containing as an emulsifying agent a water-soluble compound of the group consisting of water-soluble salts of carboxylic acids containing long hydrocarbon chains, water-soluble salts of carboxylic acids containing polycyclic systems, and water-soluble salts of sulfuric acid esters obtained by sulfation of hydroxy compounds containing long hydrocarbon chains, chloro-2-butadiene-1,3 which is substantially free from impurities which yield acids on hydrolysis and to which has been added a quantity of sulfur ranging from about 0.25% of the weight of the chloro-2-butadiene-1,3 up to about the amount soluble in the chloro-2-butadiene-1,3 under the conditions of the polymerization and to which has also been added a small amount insufficient to cause reversal in phase of the emulsion of a non-polymerizable alcohol having a solubility in water limited to from about 1% to about 20% at ordinary temperature, and then polymerizing the chloro-2-butadiene-1,3 while so dispersed in the presence of the water-soluble non-polymerizable alcohol and of the sulfur, and thereafter when polymerization is complete adding to the resulting dispersion from about 1% to about 5% by weight, based on the polymer, of a water-soluble compound which contains the following nucleus

in which $R_1$ is a divalent aliphatic radical and $R_2$, $R_3$, and $R_4$ are monovalent aliphatic radicals, one of which radicals $R_1$, $R_2$, $R_3$, and $R_4$ contains more than 12 carbon atoms, in which N is separated from X by less than 5 carbon atoms and in which —X—O— is an acidic salt-forming group, the free valences of the nitrogen and of the oxygen in the nucleus having been satisfied in the compounds by each other or by a pair of oppositely charged ions.

18. The process which comprises dispersing in an aqueous medium containing as an emulsifying agent a water-soluble compound of the group consisting of water-soluble salts of carboxylic acids containing long hydrocarbon chains, water-soluble salts of carboxylic acids containing polycyclic systems, and water-soluble salts of sulfuric acid esters obtained by sulfation of hydroxy compounds containing long hydrocarbon chains, chloro-2-butadiene-1,3 which is substantially free from impurities which yield acids on hydrolysis and to which has been added a quantity of sulfur ranging from about 0.25% of the weight of the chloro-2-butadiene-1,3 up to about the amount soluble in the chloro-2-butadiene-1,3 under the conditions of the polymerization and to which has also been added a small amount insufficient to cause reversal in phase of the emulsion of a non-polymerizable ketone having a solubility in water limited to from about 1% to about 20% at ordinary temperature, and then polymerizing the chloro-2-butadiene-1,3 while so dispersed in the presence of the water-soluble non-polymerizable ketone and of the sulfur, and thereafter when polymerization is complete adding to the resulting dispersion from about 1% to about 5%, by weight, based on the polymer, of a water-soluble compound which contains the following nucleus

in which $R_1$ is a divalent aliphatic radical and $R_2$, $R_3$, and $R_4$ are monovalent aliphatic radicals, one of which radicals $R_1$, $R_2$, $R_3$, and $R_4$ contains more than 12 carbon atoms, in which N is separated from X by less than 5 carbon atoms and in which —X—O— is an acidic salt-forming group, the free valences of the nitrogen and of the oxygen in the nucleus having been satisfied in the compounds by each other or by a pair of oppositely charged ions.

19. The process which comprises dispersing chloro-2-butadiene-1,3 in an aqueous medium containing as an emulsifying agent a water-soluble compound of the group consisting of water-soluble salts of carboxylic acids containing long hydrocarbon chains, water-soluble salts of carboxylic acids containing polycyclic systems, and water-soluble salts of sulfuric acid esters obtained by sulfation of hydroxy compounds containing long hydrocarbon chains and also containing from about 0.25% to about 1%, by weight, based on the chloro-2-butadiene-1,3, of a water-soluble compound which contains the following nucleus

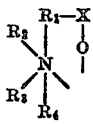

in which $R_1$ is a divalent aliphatic radical and $R_2$, $R_3$, and $R_4$ are monovalent aliphatic radicals, one of which radicals $R_1$, $R_2$, $R_3$, and $R_4$ contains more than 12 carbon atoms, in which N is separated from X by less than 5 carbon atoms and in which —X—O— is an acidic salt-forming group, the free valences of the nitrogen and of the oxygen in the nucleus having been satisfied in the compounds by each other or by a pair of oppositely charged ions, said chloro-2-butadiene-1,3 when dispersed being substantially free from impurities which yield acids on hydrolysis and containing a quantity of sulfur ranging from about 0.25% of the weight of the chloro-2-butadiene-1,3 up to about the amount soluble in the chloro-2-butadiene-1,3 under the conditions of the polymerization and also containing a small amount insufficient to cause reversal in phase of the emulsion of a non-polymerizable alcohol and a non-polymerizable ketone each having a solubility in water limited to from about 1% to about 20% at ordinary temperature, and polymerizing the chloro-2-butadiene-1,3 while so dispersed in the presence of the various added materials.

20. The process which comprises dispersing chloro-2-butadiene-1,3 in an aqueous medium containing as an emulsifying agent a water-soluble compound of the group consisting of water-soluble salts of carboxylic acids containing long hydrocarbon chains, water-soluble salts of carboxylic acids containing polycyclic systems, and water-soluble salts of sulfuric acid esters obtained by sulfation of hydroxy compounds containing long hydrocarbon chains and also containing from about 0.25% to about 1%, by weight, based on the chloro-2-butadiene-1,3, of a water-soluble compound which contains the following nucleus

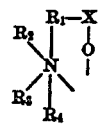

in which $R_1$ is a divalent aliphatic radical and $R_2$, $R_3$, and $R_4$ are monovalent aliphatic radicals, one of which radicals $R_1$, $R_2$, $R_3$, and $R_4$ contains more than 12 carbon atoms, in which N is separated from X by less than 5 carbon atoms and in which —X—O— is an acidic salt-forming group, the free valences of the nitrogen and of the oxygen in the nucleus having been satisfied in the compounds by each other or by a pair of oppositely charged ions, said chloro-2-butadiene-1,3 when dispersed being substantially free from impurities which yield acids on hydrolysis and containing a quantity of sulfur ranging from about 0.25% of the weight of the chloro-2-butadiene-1,3 up to about the amount soluble in the chloro-2-butadiene-1,3 under the conditions of the polymerization and also containing a small amount insufficient to cause reversal in phase of the emulsion of a non-polymerizable alcohol having a solubility in water limited to from about 1% to about 20% at ordinary temperature, and polymerizating the chloro-2-butadiene-1,3 while so dispersed in the presence of the various added materials.

21. The process which comprises dispersing chloro-2-butadiene-1,3 in an aqueous medium containing as an emulsifying agent a water-soluble compound of the group consisting of water-soluble salts of carboxylic acids containing long hydrocarbon chains, water-soluble salts of carboxylic acids containing polycyclic systems, and water-soluble salts of sulfuric acid esters obtained by sulfation of hydroxy compounds containing long hydrocarbon chains and also containing from about 0.25% to about 1%, by weight, based on the chloro-2-butadiene-1,3, of a water-soluble compound which contains the following nucleus

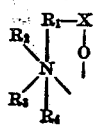

in which $R_1$ is a divalent aliphatic radical and $R_2$, $R_3$, and $R_4$ are monovalent aliphatic radicals, one of which radicals $R_1$, $R_2$, $R_3$, and $R_4$ contains more than 12 carbon atoms, in which N is separated from X by less than 5 carbon atoms and in which —X—O— is an acidic salt-forming group, the free valences of the nitrogen and of the oxygen in the nucleus having been satisfied in the compounds by each other or by a pair of oppositely charged ions, said chloro-2-butadiene-1,3 when dispersed being substantially free from impurities which yield acids on hydrolysis and containing a quantity of sulfur ranging from about 0.25% of the weight of the chloro-2-butadiene-1,3 up to about the amount soluble in the chloro-2-butadiene-1,3 under the conditions of the polymerization and also containing a small amount insufficient to cause reversal in phase of the emulsion of a non-polymerizable ketone having a solubility in water limited to from about 1% to about 20% at ordinary temperature, and polymerizing the chloro-2-butadiene-1,3 while so dispersed in the presence of the various added materials.

HERBERT W. WALKER.
FRANK N. WILDER.

Certificate of Correction

Patent No. 2,263,322. November 18, 1941.

HERBERT W. WALKER ET AL.

It is hereby certified that error appears in the printed specification of the above numbered patent requiring correction as follows: Page 2, first column, lines 70 to 74 inclusive, in the formulae, for $\dfrac{``+MY\text{''}}{-MY}$ read $\dfrac{+MY}{-MY}$; and that the said Letters Patent should be read with this correction therein that the same may conform to the record of the case in the Patent Office.

Signed and sealed this 30th day of December, A. D. 1941.

[SEAL]

HENRY VAN ARSDALE,
*Acting Commissioner of Patents.*